(12) United States Patent  
Wilhelm et al.

(10) Patent No.: US 11,474,054 B2
(45) Date of Patent: Oct. 18, 2022

(54) TEMPERATURE CONTROL APPARATUSES AND METHODS

(71) Applicant: Equistar Chemicals, LP, Houston, TX (US)

(72) Inventors: Steven M. Wilhelm, Mason, OH (US); Kristy S. McKenna, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 150 days.

(21) Appl. No.: 16/659,747

(22) Filed: Oct. 22, 2019

(65) Prior Publication Data

US 2020/0124547 A1    Apr. 23, 2020

Related U.S. Application Data

(60) Provisional application No. 62/748,889, filed on Oct. 22, 2018.

(51) Int. Cl.
*G01N 25/00* (2006.01)
*G01K 7/16* (2006.01)

(52) U.S. Cl.
CPC ............ *G01N 25/00* (2013.01); *G01K 7/16* (2013.01)

(58) Field of Classification Search
CPC .......... G01N 25/4866; G01N 25/20; G01N 2223/31; G01N 25/486; G01N 25/00; G01N 25/4833; G01N 2030/3046; G01N 30/14; G01N 5/04; G01N 5/045; G01K 17/00; G01K 17/04; G01K 11/06; G01K 3/04; G01K 17/006; G01K 7/16; G01K 7/32; G01K 7/36; C01K 7/16
USPC ...... 374/10–12, 29–39, 45; 422/51; 436/147
See application file for complete search history.

(56) References Cited

U.S. PATENT DOCUMENTS

| | | | | |
|---|---|---|---|---|
| 1,447,100 A | * | 2/1923 | Pardoe | F16D 69/022 |
| | | | | 188/259 |
| 3,266,307 A | * | 8/1966 | De Winter | G01K 17/04 |
| | | | | 374/34 |
| 3,267,728 A | * | 8/1966 | Solomons | G01N 25/48 |
| | | | | 374/34 |

(Continued)

FOREIGN PATENT DOCUMENTS

| | | | | |
|---|---|---|---|---|
| CN | 106917073 A | * | 7/2017 | C23C 16/458 |
| JP | 2019086318 A | * | 6/2019 | |

(Continued)

OTHER PUBLICATIONS

Journal of Materials Science 20 (1985) pp. 4553-4560, "The initiation of slow crack growth in linear polyethylene under single edge notch tension and plane strain", Norman Brown and S.K. Bhattacharya.

*Primary Examiner* — Gail Kaplan Verbitsky (57) ABSTRACT

Provided herein are apparatuses that include a testing device and a controller. The testing device may include a chamber, a sample holder, a temperature sensor, and a heater band or a heater. The controller may be in communication with at least one of the temperature sensor and the heater band or the heater. The apparatuses may include one or more testing devices, and the testing devices may be arranged in a bin. Methods of performing a test with the apparatuses are also provided.

7 Claims, 4 Drawing Sheets

(56) References Cited

U.S. PATENT DOCUMENTS

| | | | | |
|---|---|---|---|---|
| 4,255,961 | A * | 3/1981 | Biltonen | G01N 25/4866 374/11 |
| 4,350,446 | A * | 9/1982 | Johnson | G01N 25/4866 374/13 |
| 5,098,196 | A * | 3/1992 | O'Neill | G01N 25/4826 219/497 |
| 5,335,993 | A * | 8/1994 | Marcus | G01N 25/18 374/11 |
| 5,711,604 | A * | 1/1998 | Nakamura | G01N 25/18 374/10 |
| 5,842,788 | A * | 12/1998 | Danley | G01N 25/4833 374/12 |
| 5,988,875 | A * | 11/1999 | Gershfeld | G01N 25/4866 374/10 |
| 6,318,890 | B1 * | 11/2001 | Hutter | G01N 25/4846 374/1 |
| 6,869,214 | B2 * | 3/2005 | Plotnikov | G01N 25/4806 374/10 |
| 8,359,180 | B2 * | 1/2013 | Yamada | G01N 25/4866 702/136 |
| 8,926,172 | B2 * | 1/2015 | Wu | G01K 17/04 374/34 |
| 11,047,748 | B1 * | 6/2021 | Wu | G01N 25/4866 |
| 2002/0085615 | A1 * | 7/2002 | Nakamura | A61P 17/00 374/12 |
| 2003/0156621 | A1 * | 8/2003 | McWilliams | H05B 1/0266 374/149 |
| 2007/0189357 | A1 * | 8/2007 | Nishimura | G01N 25/4866 374/10 |
| 2008/0025364 | A1 * | 1/2008 | Nakatani | G01N 25/20 374/12 |
| 2009/0034579 | A1 * | 2/2009 | Schick | G01N 25/4866 374/10 |
| 2009/0154520 | A1 * | 6/2009 | Richner | G01N 25/005 374/31 |
| 2010/0220764 | A1 * | 9/2010 | Nishimura | G01N 25/4866 374/10 |
| 2011/0007775 | A1 * | 1/2011 | Wu | G01N 25/4866 374/11 |
| 2011/0235671 | A1 * | 9/2011 | Yamada | G01N 25/4866 374/12 |

FOREIGN PATENT DOCUMENTS

| | | | |
|---|---|---|---|
| RU | 205420 | U1 * | 7/2021 |
| SU | 1747825 | A1 * | 7/1992 |

* cited by examiner

TEMPERATURE CONTROL APPARATUSES AND METHODS

CROSS-REFERENCE TO RELATED APPLICATIONS

This application is the Non-Provisional patent application, which claims benefit of priority to U.S. Provisional Application No. 62/748,889, filed Oct. 22, 2018, the contents of which are incorporated herein by reference in their entirety.

TECHNICAL FIELD

In general, the present disclosure relates to the field of chemistry, analytical chemistry and polymer chemistry. More specifically, the present disclosure relates to an apparatus and testing methods for rheological properties of a polymer and/or polymeric composition.

BACKGROUND

A number of testing procedures, such as ASTM F1473, include exposing a specimen to a particular temperature or a narrow range of temperatures for various periods of time, including periods that may exceed 1,000 hours.

In an effort to maintain the temperature over the course of testing, testing apparatuses have been designed that rely on circulated hot air. In some apparatuses, circulated hot air has been used to control the temperature across multiple stations within a single oven.

Circulating hot air, however, can include the use of a fan, and fans, particularly fan motors, can subject an apparatus and/or a tested specimen to vibrations. The vibrations can lead to one or more problems, such as testing inconsistencies.

Circulating hot air also can lead to (i) poor control of temperature at or near a tested specimen, (ii) the loss of use of some testing stations due to poor temperature uniformity, or (iii) a combination hereof.

Therefore, there remains a need for apparatuses that do not rely on circulating hot air, including apparatuses capable of achieving temperature control, uniformity of testing results, or a combination thereof.

BRIEF SUMMARY

Provided herein are apparatuses that may address one or more of the foregoing needs, including apparatuses that do not include a circulating fan, offer improved temperature control at or near a tested specimen, or a combination thereof.

Apparatuses including one or more testing devices are provided. In some embodiments, the apparatuses include a testing device and a controller.

The testing device, in some embodiments, includes (i) a chamber, the chamber having an inner surface and an outer surface, (ii) a sample holder arranged in the chamber, (iii) a temperature sensor having a sensing portion, wherein the sensing portion is arranged adjacent to the sample holder, and (iv) a heater band that is (a) arranged on the outer surface or the inner surface of the chamber, and (b) in contact with at least 70% of a circumference of the chamber. In some embodiments, the heater band is in contact with 100% of a circumference of the chamber. The controller may be in communication with at least one of the temperature sensor and the heater band.

In some embodiments, the testing device includes (i) a chamber having a top portion and a bottom portion, (ii) a sample holder arranged in the chamber, (iii) a temperature sensor having a sensing portion, wherein the sensing portion is arranged adjacent to the sample holder, (iv) a heater arranged at the bottom portion of the chamber, and (v) a heat shield, wherein at least a portion of the heat shield is arranged between the heater and the sample holder. The heat shield, in some embodiments, includes (i) a reservoir in which the heater is arranged, and (ii) a plate that is arranged between the heater and the sample holder. The controller may be in communication with at least one of the temperature sensor and the heater.

In some embodiments, the apparatuses provided herein include one or more of the testing devices (e.g., 2, 4, 6, 12, etc.). The apparatuses may also include a bin, wherein one or more of the testing devices are arranged in the bin.

DETAILED DESCRIPTION

Provided herein are apparatuses that may be used for a variety of applications, such as performing various tests, including ASTM F1473 PENT (Pennsylvania notch test). The apparatuses provided herein may include one temperature sensor, and the temperature sensor may control and monitor a test performed in the apparatuses. Therefore, it is believed that improved temperature control at or near a specimen subject to the testing may be achieved in some embodiments.

Heater Band Apparatuses

In some embodiments, the apparatuses provided herein include a testing device that includes a heater band. In some embodiments, the apparatuses include a testing device, the testing device including (i) a chamber having an outer surface and an inner surface, (iv) a heater band that is (a) arranged on the outer surface or the inner surface of the chamber, and (b) in contact with at least 70% of a circumference of the chamber. In some embodiments, the heater band is arranged on the outer surface of the chamber. In some embodiments, the heater band is arranged on the inner surface of the chamber.

In some embodiments, the heater band is in contact with at least 75% of a circumference of the chamber. In some embodiments, the heater band is in contact with at least 80% of a circumference of the chamber. In some embodiments, the heater band is in contact with at least 85% of a circumference of the chamber. In some embodiments, the heater band is in contact with at least 95% of a circumference of the chamber. In some embodiments, the heater band is in contact with 100% of a circumference of the chamber. For example, if a chamber has a cylindrical shape and a circumference of X, then a heater band having a longitudinal axis of 0.75 X will contact 75% of the circumference when the heater band is (i) arranged on and in contact with the chamber, and (ii) the longitudinal axis of the heater band is perpendicular to the longitudinal axis of the chamber.

It should be noted, however, that the term "circumference" is used to denote a shortest distance around the outer surface or the inner surface of a chamber at a particular location, and does not imply that a chamber is necessarily cylindrical. In some embodiments, the chamber to which a heater band is associated has a cross-sectional shape that is non-polygonal. Non-limiting examples of non-polygonal cross-sectional shapes include circular, elliptical, oval, etc.

It also should be noted that the heater band may be applied in any manner (e.g., angle) so long as at least 70% of a circumference of a chamber contact the heater band. The longitudinal axis of a heater band, for example, may be perpendicular to the longitudinal axis of a chamber, but other angles are envisioned (e.g., 35° to 90° (i.e., perpendicular)).

In some embodiments, the outer surface or the inner surface of a chamber has a top portion, a middle portion, and a bottom portion, and the heater band is in contact with the middle portion of the outer surface or the inner surface. For example, when a chamber has a longitudinal axis of X, and the chamber is arranged vertically, (i) the "top portion" is the portion of the chamber that is above 0.8 X, as measured from the bottom of the vertically aligned chamber, (ii) the "bottom portion" is the portion of the chamber that is below 0.2 X, as measured from the bottom of the vertically aligned chamber, and (iii) the "middle portion" is the portion of the chamber from 0.2 X to 0.8 X. A heater band that is in contact with a middle portion of the outer surface or the inner surface of a chamber may contact (i) a middle portion of the outer surface or the inner surface, or (ii) a middle portion of the outer surface or the inner surface of a chamber and at least one of the lower portion and the top portion of the outer surface or the inner surface.

It should be noted that the phrases used herein, such as "top portion" and "bottom portion" are used to ease the descriptions of the chambers and are based on a chamber that is hypothetically arranged vertically. The foregoing phrases, however, should not be construed as requiring the chambers of the apparatuses herein to be arranged vertically in some embodiments.

In some embodiments, the placement of a heater band may be selected based on the location of a sample in a chamber. For example, a heater band may be arranged at a position on a vertically aligned chamber so that at least 50% of the surface area of the heater band is above the mid-point of a sample in a chamber. As a further example, a heater band may be arranged at a position on a vertically aligned chamber so that about half of the surface area of the heater band is above the mid-point of a sample in a chamber. As a further example, a heater band may be arranged at a position on a vertically aligned chamber so that at least 50% of the surface area of the heater band is below the mid-point of a sample in a chamber.

Figure 1A:
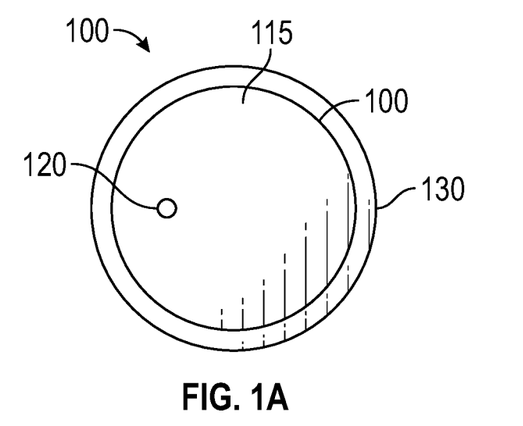
FIG. 1A depicts a top view of an embodiment of a chamber and a heater band.
Figure 1B:
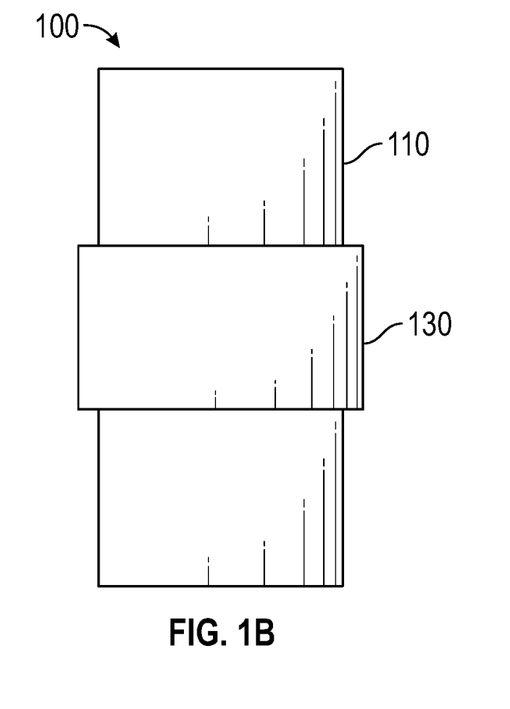
FIG. 1B depicts a side view of the chamber and heater band of FIG. 1A.
Figure 1C:
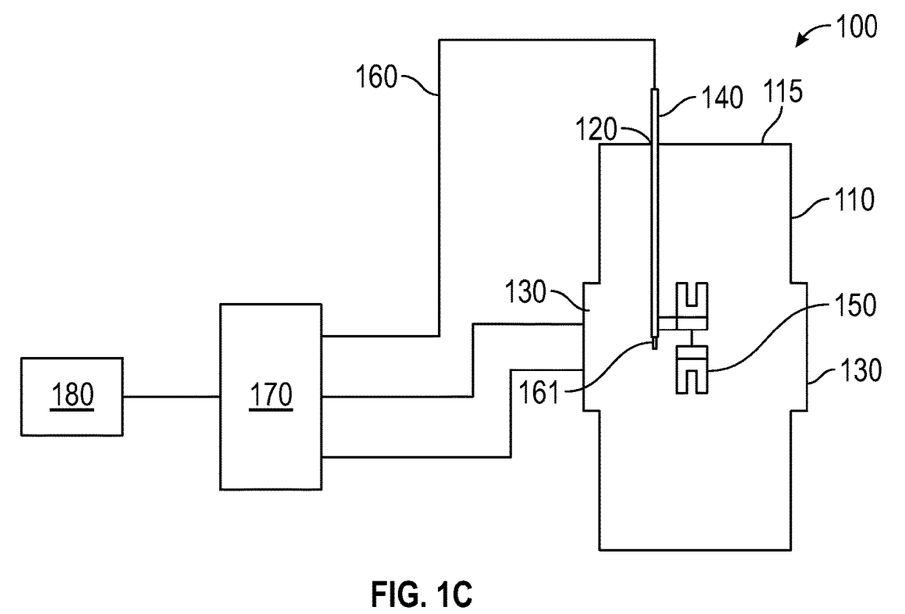
FIG. 1C depicts a cross-sectional view of a testing device that includes the chamber and heater band of FIG. 1A and FIG. 1B, an embodiment of a temperature sensor, and an embodiment of a sample holder, and the testing device is in communication with a controller, which is connected to a power source.

One embodiment of an apparatus is depicted at FIG. 1A, FIG. 1B, and FIG. 1C, which depict, respectively, a top view of a chamber, a side view of a chamber, and a cross-sectional view of a chamber.

FIG. 1A depicts a top view of an embodiment of a chamber 100 that has a cross-sectional shape that is circular. The chamber 100 has an outer surface 110 and a cap 115. A heater band 130 is arranged on a portion of the outer surface 110, and contacts 100% of the circumference of the outer surface 110. The cap 115 includes an opening 120.

FIG. 1B depicts a side view of the chamber 100 of FIG. 1A. A heater band 130 is arranged on a portion of the outer surface 110.

FIG. 1C depicts a cross-sectional view of a testing device that includes the chamber 100 and heater band 130 of FIG. 1A and FIG. 1B. A portion of the outer surface 110 of the chamber 100 is contacted by a heater band 130. The cap 115 of the chamber 100 has an opening 120 that accommodates a support 140. Through the support 140, a temperature sensor 160 having a sensing portion 161 is provided. The sensing portion 161 is adjacent to the sample holder 150, which is connected to the support 140. The heater band 130 and the temperature sensor 160 are in communication with a controller 170, which is connected to a power source 180.

Figure 1D:
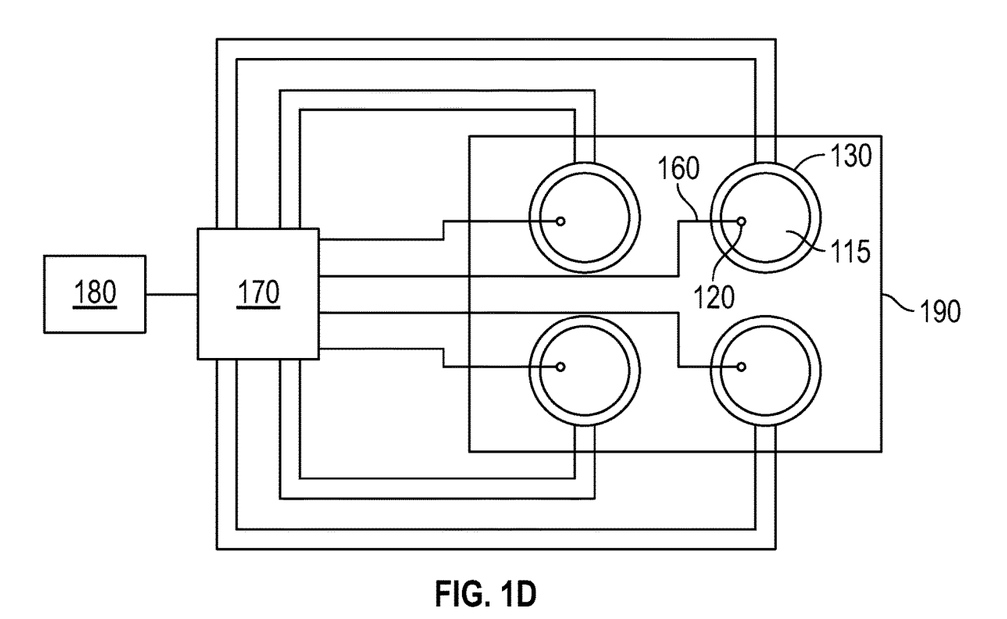
FIG. 1D depicts a top view of an embodiment of a bin that includes four of the testing devices of FIG. 1C.

FIG. 1D depicts an embodiment of a bin 190. The bin 190 includes four of the testing devices depicted at FIG. 1C. Each testing device includes a cap 115, a heater band 130, and a temperature sensor 160. The heater bands 130 and the temperature sensors 160 are in communication with a programmable logic controller (PLC) 170 with multiple control loops, which is connected to a power source 180. Each control loop is assigned to a separate testing device. Although a single PLC 170 is depicted at FIG. 1D, other embodiments are envisioned that include multiple controllers. An apparatus, for example, may include more than one controller. In some embodiments, each testing device may be in communication with a separate controller.

The heater band may be any material capable of applying heat to a chamber. The heater band may be flexible to permit its application to a chamber. The heater band may be connected to a controller, as described herein. The heater band may be one that is commercially available (e.g., Big Chief, Inc.).

A heater band may have any dimensions. The dimensions of a heater band may be selected based on the dimensions of a chamber. A heater band may have at least one axis (e.g., a longitudinal axis) that is capable of contacting at least 70% of a circumference of a chamber. A heater band that is capable of contacting 100% of a circumference of a chamber may have at least one axis that exceeds a circumference of a chamber. A heater band may have one axis (e.g., a latitudinal axis) of about 2 inches to about 8 inches, about 2 inches to about 7 inches, about 3 inches to about 7 inches, about 4 inches to about 6 inches, or about 5 inches.

Heaters and Heat Shields

In some embodiments, the testing devices of the apparatuses provided herein include a chamber having a top portion and a bottom portion, a heater arranged at the bottom portion of the chamber, and a heat shield, wherein at least a portion of the heat shield is arranged between the heater and the sample holder. The heater, in some embodiments, is (i) at the bottom portion of a chamber, and (ii) within the chamber.

The heat shield may include one or more pieces. In some embodiments, the heat shield includes a plate that is arranged between the heater and the sample holder. In some embodiments, the heat shield includes (i) a reservoir in which the heater is arranged, and (ii) a plate that is arranged between the heater and the sample holder. The plate and reservoir may be sized so that a gap exists between the reservoir and the plate.

The heat shield may be made of any materials, including materials that are resistant to the temperatures applied by a heater. In some embodiments, the heat shield may include one or more metals or metal alloys, such as stainless steel, chrome, nickel, aluminum, copper, etc.

The chambers in which a heater and a heat shield are disposed may be of any size or shape. In some embodiments, the chambers in which a heater and a heat shield are disposed have a cross-sectional shape that is polygonal. For example, the chambers in which a heater and a heat shield are disposed may have a cross-sectional shape that is square, rectangular, etc. In some embodiments, the chambers in which a heater and a heat shield are disposed have a cross-sectional shape that is non-polygonal. For example, the chambers in which a heater and a heat shield are disposed may have a cross-sectional shape that is spherical, elliptical, oval, etc.

Figure 2A:
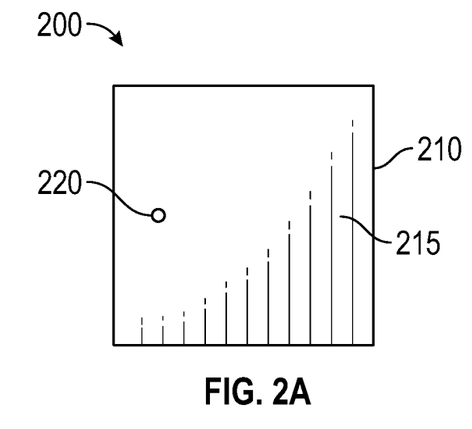
FIG. 2A depicts a top view of an embodiment of a chamber.

FIG. 2A depicts a top view of an embodiment of a chamber 200 that has a cross-sectional shape that is square. The chamber 200 has an outer surface 210 and a cap 215. The cap 215 includes an opening 220.

Figure 2B:
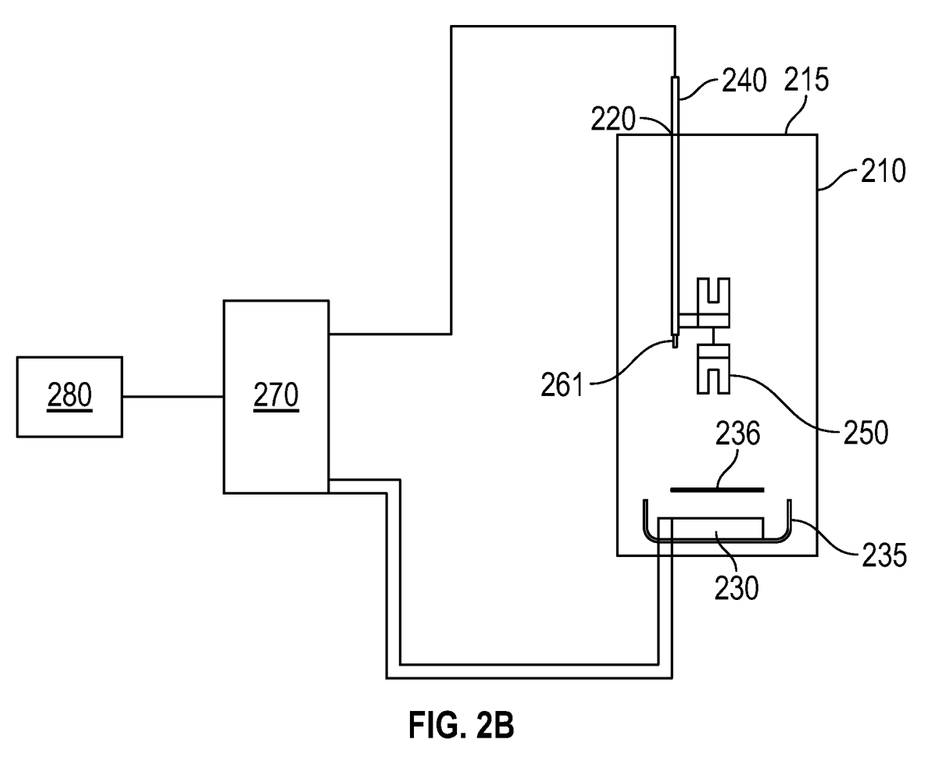
FIG. 2B depicts a cross-sectional view of a testing device that includes the chamber of FIG. 2A, an embodiment of a temperature sensor, and an embodiment of a sample holder, and the testing device is in communication with a controller, which is connected to a power source.

FIG. 2B depicts a cross-sectional view of a testing device that includes the chamber 200 of FIG. 2A. The cap 215 of the chamber 200 has an opening 220 that accommodates a support 240. Through the support 240, a temperature sensor 260 having a sensing portion 261 is provided. The sensing portion 261 is adjacent to the sample holder 250, which is connected to the support 240. The chamber 200 also includes a heater 230. The heater 230 is arranged in a heat shield having two parts—a reservoir 235 in which the heater 230 is disposed, and a plate 236 arranged between the heater 230 and the sample holder 250. The heater 230 and the temperature sensor 260 are in communication with a controller 270, which is connected to a power source 280.

Figure 2C:
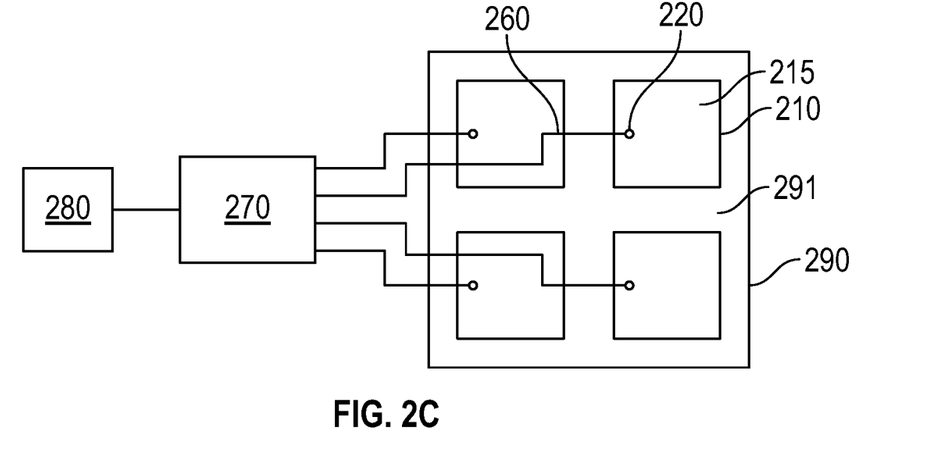
FIG. 2C depicts a top view of an embodiment of a bin that includes four of the testing devices of FIG. 2B.

FIG. 2C depicts an embodiment of a bin 290. The bin 290 includes four of the testing devices depicted at FIG. 2B. Each testing device includes a cap 215, an outer surface 210, and a temperature sensor 260. The heaters (see FIG. 2B) and the temperature sensors 260 are in communication with a PLC 270 having multiple control loops, which is connected to a power source 280. Each testing device is in communication with a separate control loop. The lines connecting the heaters of FIG. 2C to the controller 270 are not shown, as the heaters of this embodiment are disposed within, as opposed to outside, the chambers. Although a single PLC 270 is depicted at FIG. 2C, other embodiments are envisioned that include multiple controllers. An apparatus, for example, may include more than one controller. In some embodiments, each testing device may be in communication with a separate controller.

Chambers

The chambers of the embodiments provided herein may be formed of any one or more materials that do not undesirably impact a desired function of the apparatuses. In some embodiments, the chambers include aluminum. In some embodiments, the chambers include copper.

In some embodiments, the chambers include a fixed or removable cap at one or both ends of the chambers. In some embodiments, the fixed or removable cap may include at least one opening. The at least one opening can accommodate any piece of equipment, such as a temperature sensor, a support, etc. The fixed or removable cap may be formed of the same material as the chamber, or at least one different material.

If a cap is present, the cap, the portion of the chamber to which the cap is applied, or both may include a material that improves the seal between the cap and the body of the chamber. The material may include a polymeric material, which may form an o-ring, or an other insulating or sealing material. A polymer material, insulating, or sealing material also may be used in a similar manner with regard to the at least one opening that appears in some embodiments of the caps.

When a cap is removed from a chamber to insert or remove a specimen from a sample holder, a substitute cap may be applied to the chamber to retain the position of a temperature sensor, other equipment, of a combination thereof.

Sample Holder

The testing devices provided herein may include a chamber in which a sample holder is arranged. The sample holder may be configured to hold a specimen for testing. In some embodiments, the sample holder includes a single point of attachment, the point of attachment being capable of retaining a specimen. For example, the point of attachment may be capable of "pinching" a sample (e.g., a clamp, vice, clip, etc.), or penetrating a sample (e.g., an awl, pick, etc.). In some embodiments, the sample includes a first point of attachment and a second point of attachment, the first point of attachment and the second point of attachment permitting a sample to be held at two locations. The two locations of a sample may be at opposing ends of a sample.

A sample holder may be arranged at any location and by any means within a chamber. In some embodiments, the sample holder is affixed to a support that extends out of a chamber through at least one opening of a cap or other section of a chamber. The sample holder may be affixed at a location of the support that ensures that the sample holder, and, therefore, the specimen, is centered (horizontally, vertically, or both) within a chamber. In some embodiments, a sample holder is affixed to a wall of a chamber.

The sample holder may be configured to hold a sample of any desired size. In some embodiments, the sample has a length of about 75 mm to about 125 mm, a width of about 25 mm to about 75 mm, and a thickness of about 20 mm to about 30 mm. In some embodiments, the sample has a length of about 80 mm to about 120 mm, a width of about 35 mm to about 65 mm, and a thickness of about 23 mm to about 27 mm. In some embodiments, the sample has a length of about 90 mm to about 110 mm, a width of about 40 mm to about 60 mm, and a thickness of about 24 mm to about 26 mm. In some embodiments, the sample has a length of about 95 mm to about 105 mm, a width of about 45 mm to about 55 mm, and a thickness of about 24 mm to about 26 mm. In some embodiments, the apparatuses provided herein are configured to perform ASTM F1473 PENT, and the sample size is about 50 mm×100 mm×25 mm, and has a notch of about 10 mm.

The samples may be capable of holding any material, as the apparatuses described herein may be used to test any material, including, but not limited to, polymers (e.g., plastics), metals, etc. In some embodiments, the samples include polyethylene, polypropylene, nylon, or a combination thereof.

In some embodiments, the sample includes a high density polyethylene (HDPE), such as a high molecular weight HDPE, a bimodal high molecular weight HDPE, or a combination thereof. In some embodiments, the HDPE is a pipe-grade HDPE. The bimodal high molecular weight HDPE may have a pipe material designation code of PE 3608 or PE 4710. The bimodal high molecular weight HDPE may also have a pipe material designation code of PE 100. Alternatively, the HDPE may be prepared as described in U.S. Pat. No. 9,249,286, the disclosure of which is incorporated herein by reference; an alternative commercially available HDPE is Alathon® L4904, a product of Lyondell-Basell (Houston, Tex.). Alathon® L4904 has a melt flow rate (190° C./2.16 kg) of about 0.04 g/10 min., an HLMI (190° C./2.16 kg) of about 7.0 g/min., a density of about 0.949 g/cm$^3$ (23° C.), a flexural modulus of about 146,000 psi (1007 MPa; 2% secant), a tensile stress at break of about 5100 psi, a tensile stress at yield of about 3500 psi, and a tensile elongation at break of about 800%.

Temperature Sensor

Any temperature sensor may be used in the apparatuses provided herein. The testing devices provided herein may include one temperature sensor that monitors and controls the temperature. Not wishing to be bound by any particular theory, it is believed that such a configuration may provide improved temperature control.

The temperature sensors may include a sensing portion, and the sensing portion may be arranged adjacent to the sample holder. The "sensing portion" refers to the part of the temperature sensor that is capable of measuring a temperature. The "sensing portion" is located at the tip of a temperature sensor.

A sensing portion is "adjacent to" a sample holder when the sensing portion is positioned to measure the temperature in the vicinity of the sample, or, in other words, within a distance that is less than or equal to 1.5× the largest dimension of the sample. In some embodiments, the shortest distance between any point of the sensing portion and any point of the sample that is retained by the sample holder is 2.5 inches or less.

In some embodiments, the sensing portion is arranged about 0.1 inches to about 2 inches from the sample. In some embodiments, the sensing portion is arranged about 0.5 inches to about 2 inches from the sample. In some embodiments, the sensing portion is arranged about 0.5 inches to about 1.5 inches from the sample. In some embodiments, the sensing portion is arranged about 0.5 inches to about 1.0 inch from the sample. In some embodiments, the sensing portion is arranged about 0.5 inches to about 0.8 inches from the sample.

Any temperature sensor may be used in the testing devices described herein. In some embodiments, the temperature sensor is a resistance temperature detector (RTD).

The temperature sensor may be positioned by associating it with a support, a sample holder, or both. In some embodiments, a temperature sensor may be provided through a support, along a support, or a combination thereof.

Controller

The apparatuses described herein may include a controller. The controller may be in communication with a temperature sensor, a heater or heater band, or both (i) a temperature sensor and (ii) a heater or heater band.

The controller may be used to control a heater or heater band in view of input provided by a temperature sensor.

A controller may be connected to a power source.

The controller may include a PLC having multiple control loops. Each control loop may be in communication with a separate testing device.

In some embodiments, the apparatuses herein include one controller for each testing device.

Bins

The apparatuses provided herein may include a bin. One or more of the testing devices described herein may be arranged in a bin. In some embodiments, the apparatuses provided herein include two or more testing devices, and the two or more testing devices are arranged in a bin.

Embodiments of a bin including four testing devices are depicted at FIG. 1D and FIG. 2C. A bin may include any number of testing devices, such as 2 to 16 testing devices, 2 to 14 testing devices, 2 to 12 testing devices, 4 to 12 testing devices, 6 to 12 testing devices, etc.

When two or more devices are arranged in a bin, each testing device may have a temperature sensor and a heater (or heater band), and each of the temperature sensors and heaters (or heater bands) may be in communication with one or more controllers. In other words, a bin may be associated with one controller, such as a PLC having multiple control loops, in communication with the temperature sensors and heaters (or heater bands) associated with the testing devices, or the bin may be associated with more than one controller, wherein each of the one or more controllers controls the temperature sensor and heaters (or heater bands) of one or more testing devices.

In some embodiments, a bin includes an insulating material arranged between two or more testing devices. Any insulating material may be used for this purpose. In some embodiments, an air gap exists between two or more testing devices in a bin.

The bins may be of any size or shape that is capable of receiving a desired number of testing devices.

A bin may be sub-divided into sections. In some embodiments, a bin includes two or more square-shaped or rectangular-shaped sections, and each of the square-shaped or rectangular-shaped sections forms a chamber of the two or more testing devices. A heater and heat shield may be arranged in each of the square-shaped or rectangular-shaped sections.

The bins described herein may be made of any material. In some embodiments, the bins are formed, at least in part, of mild steel (i.e., low carbon steel).

Methods

Also provided herein are methods of performing a test. In some embodiments, the methods herein include providing an apparatus as described herein, arranging a sample in a sample holder of the apparatus, and subjecting the sample to an increased temperature. In some embodiments, the methods include providing an apparatus as described herein, and subjecting the sample to an increased temperature according to ASTM F1473 PENT.

In the descriptions provided herein, the terms "includes," "is," "containing," "having," and "comprises" are used in an open-ended fashion, and thus should be interpreted to mean "including, but not limited to." When apparatuses are claimed or described in terms of "comprising" or "including" various components or features, the apparatuses can also "consist essentially of" or "consist of" the various components or features, unless stated otherwise.

The terms "a," "an," and "the" are intended to include plural alternatives, e.g., at least one. For instance, the disclosure of "a testing device," "a bin," "a controller", and the like, is meant to encompass one, or mixtures or combinations of more than one testing device, bin, controller, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, numerical end points of ranges disclosed herein are approximate. As a representative example, Applicant discloses, in some embodiments, that the sensing portion is arranged about 0.5 inches to about 1.5 inches from the sample. This disclosure should be interpreted as encompassing values of about 0.5 inches to about 1.5 inches, and further encompasses "about" each of 0.6 inches, 0.7 inches, 0.8 inches, 0.9 inches, 1.0 inches, 1.1 inches, 1.2 inches, 1.3 inches, and 1.4 inches, including any ranges and sub-ranges between any of these values.

The present embodiments are illustrated herein by referring to various embodiments, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present embodiments or the scope of the appended claims. Thus, other aspects of the embodiments will be apparent to those skilled in the art from consideration of the specification and practice of the embodiments disclosed herein.

What is claimed is:

1. An apparatus comprising:
   a testing device comprising (i) a chamber having a top portion and a bottom portion,
   (ii) a sample holder arranged in the chamber,
   (iii) a temperature sensor having a sensing portion, wherein the sensing portion is arranged adjacent to the sample holder,
   (iv) a heater arranged at the bottom portion of the chamber, and
   (v) a heat shield, wherein at least a portion of the heat shield is arranged between the heater and the sample holder;
   a bin, wherein two or more testing devices are arrangd in the bin; and
   a controller in communication with at least one of the temperature sensor and the heater
   wherein the heat shield comprises (i) a reservoir in which the heater is arranged, and (ii) a plate that is arranged between the heater and the sample holder.

2. The apparatus of claim 1, wherein the top portion of the chamber comprises a fixed or removable cap.

3. The apparatus of claim 2, wherein the fixed or removable cap comprises at least one opening to accommodate at least the temperature sensor.

4. The apparatus of claim 1, wherein the temperature sensor is a resistance temperature detector (RTD).

5. The apparatus of claim 1, wherein the sample holder comprises a first point of attachment and a second point of attachment, the first point of attachment and the second point of attachment permitting a sample to be held at two locations.

6. The apparatus of claim 1, wherein the bin comprises an insulating material arranged between the two or more testing devices.

7. The apparatus of claim 1, wherein the bin comprises two or more square-shaped or rectangular-shaped sections, and each of the square-shaped or rectangular-shaped sections forms a chamber of the two or more testing devices.

* * * * *

UNITED STATES PATENT AND TRADEMARK OFFICE
CERTIFICATE OF CORRECTION

PATENT NO. : 11,474,054 B2
APPLICATION NO. : 16/659747
DATED : October 18, 2022
INVENTOR(S) : Wilhelm et al.

It is certified that error appears in the above-identified patent and that said Letters Patent is hereby corrected as shown below:

In the Claims

In Column 10, Claim 1, Line 6, delete "arrangd" and insert -- arranged --, therefor Signed and Sealed this
Twenty-third Day of January, 2024

Katherine Kelly Vidal
*Director of the United States Patent and Trademark Office*